US005406683A

United States Patent [19]

Arnold

[11] Patent Number: 5,406,683

[45] Date of Patent: Apr. 18, 1995

[54] HUB SEAL PULLER

[76] Inventor: Thomas J. Arnold, 13191 Jenkins St. NE., Blaine, Minn. 55449

[21] Appl. No.: 215,909

[22] Filed: Mar. 22, 1994

[51] Int. Cl.[6] ............ B23P 19/04

[52] U.S. Cl. ............ 29/235; 29/267

[58] Field of Search ............ 254/25; 29/235, 267, 29/426.5, 270, 272, 280; 81/8.1

[56] References Cited

U.S. PATENT DOCUMENTS

| | | | |
|---|---|---|---|
| 1,101,845 | 6/1914 | Grave | 254/25 |
| 2,498,458 | 2/1950 | Schwork | 254/25 |
| 4,649,618 | 3/1987 | Harrison | 29/235 |
| 4,813,120 | 3/1989 | Fournier | 29/235 |
| 4,982,483 | 1/1991 | Roush | 29/267 |
| 5,075,945 | 12/1991 | Krzecki | 29/267 |

OTHER PUBLICATIONS

Seal Puller from recent Matco Tool Catalog (1994) (item SP56, p. 262).

Seal Puller from recent Snap-On Tool Catalog (1994) item J, p. E86).

Pry bar set from recent Matco Tool Catalog (1994) (item SLF4T, p. 125).

Pry bar from recent Snap-On Tool Catalog (1994) (items A, C, p. 240).

*Primary Examiner*—Robert C. Watson

*Attorney, Agent, or Firm*—Westman, Champlin & Kelly

[57] ABSTRACT

The present invention is a tool that removes hub seals from wheel hubs. The tool comprises a blade having a flat surface, a tapered surface, a flat side, a tip edge, and a handle attached to the blade. The flat side is connected to the tip edge to form a corner, which is suitable for insertion into an annular space between the hub seal and bearings on the hub. In order to remove the hub seal, the blade is inserted into the annular space, force is applied to the handle, and leverage is used to remove the hub seal. The blade is formed so as to be strong enough to withstand the force applied to remove the hub seal yet thin enough to fit into the annular space of wheel hubs.

13 Claims, 7 Drawing Sheets

HUB SEAL PULLER

BACKGROUND OF THE INVENTION

The present invention is directed to a tool for use in removing a hub seal from a hub on a truck.

Semi trucks, comprising a tractor and trailer, provide an efficient carrier means for many goods in the United States, Canada, and the rest of the world. The tractor pulls the trailer, which carries a load of goods. The trailer comprises several axles wherein wheels are attached to the axle ends. The wheels and axles support the trailer and the load carried in the trailer. Often times, the trailer has a set of two wheels at the axle ends. These wheels are called dual wheels. Hubs provide the mechanical link between the wheels and the axles. Hubs are attached to the wheels, or dual wheels, and fit over the axles to allow the wheels and hubs to rotate around the axles.

If the hub seal begins to leak oil or the wheels must be removed from the axle for any reason, the hub seal must be changed. A hammer and drift method is typically used to change the hub seals. In this method, a mechanic must first stand the hub in its upright position. The mechanic must then insert a drift within the oil reservoir and place the drift against the bearing assembly. The drift is then struck with a hammer until the bearing assembly forces the hub seal loose.

The hammer and drift method has fallen out of favor for several reasons. First, the hammer and drift method is cumbersome. The hub must be balanced and supported both so it will remain upright during removal of the seal and so it will withstand the force applied to the bearing assembly by the drift. Also, the hammer and drift method is difficult and time-consuming. Typically, one must continuously strike the drift for approximately fifteen minutes before the seal comes loose. Because one must work through the oil reservoir, the hammer and drift method is messy. Oil from the oil reservoir and cup has a tendency to be spilled, splashed, and otherwise smeared so as to cover the hub, the mechanic, and the work space. Finally, the hammer and drift method is dangerous. While working in the oil reservoir, the mechanic's fingers and hands become slippery. The slippery hands have a tendency to lose control of the hammer. Often times, errant blows will cause the hammer to accidentally strike the hand holding the drift, or the hammer will slip so the hand holding the hammer strike the hub.

Because of the disadvantages of the hammer and drift method, others have sought alternative ways to remove the hub seal from a hub. Such alternative methods have not provided satisfactory results. Typical methods involve inserting a leverage means into the annular space and using the bearings as a fulcrum. The most apparent leverage means, a crow bar, will not fit within the annular space. Other seal puller tools comprising a handle and tip are not suited for use on 34,000 to 40,000 pound hubs. When inserted into the annular space, the tips have a tendency to roll or break under the force required to pull the hub seal. Often times, the instructions for use of these tools require the mechanic to strike the tool with a hammer. Such use again results in injury from errant blows. Nevertheless, the consensus of mechanics is that such seal puller tools are not for use on truck hubs and the only available means for removing hub seals is the difficult, messy, and dangerous hammer and drift method as described.

SUMMARY OF THE INVENTION

For the foregoing reasons, there is a need for a durable tool that allows for a quick, clean, and safe removal of hub seals from a truck hub. Furthermore, the tool must be inexpensive and easy to use so as to be available to mechanics and truck drivers who must change truck hubs.

The present invention is directed to a tool that, when used, satisfies the need for quick, clean, and safe removal of hub seals from truck hubs. The tool comprises a blade having a generally flat surface, a generally tapered surface, a flat side, a tip side, and a handle attached to the blade. The flat edge is connected to the tip edge to form a corner, which is suitable for insertion into an annular space between the hub seal and bearings on the hub. In order to remove the hub seal, the blade is inserted into the annular space, force is applied to the handle, and leverage is used to remove the hub seal. The blade is formed so as to be strong enough to withstand the force applied to remove the hub seal yet thin enough to fit into the annular space of truck hubs.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
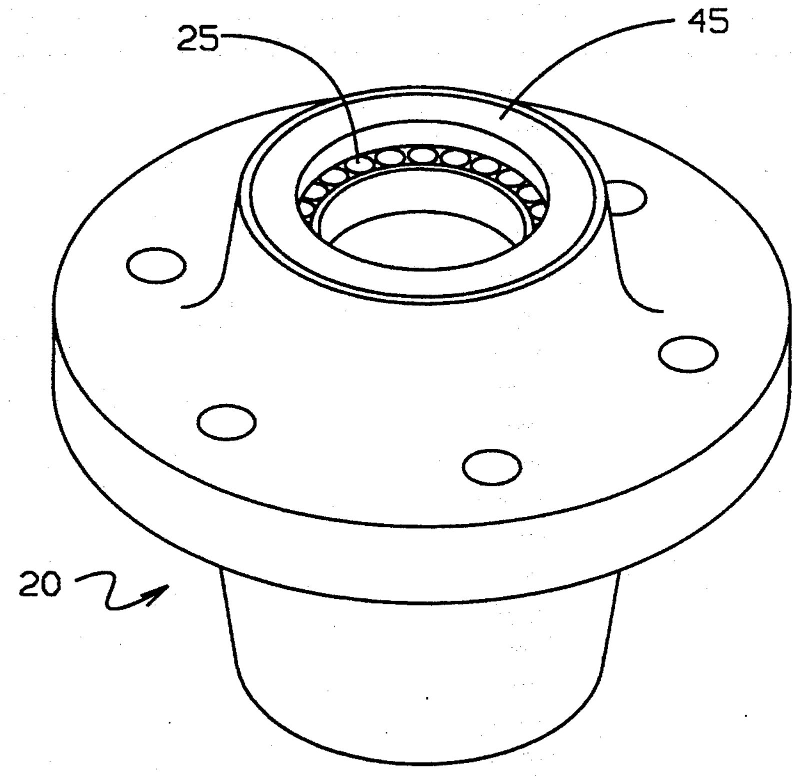
FIG. 1 shows a perspective view of a typical hub.
Figure 2:
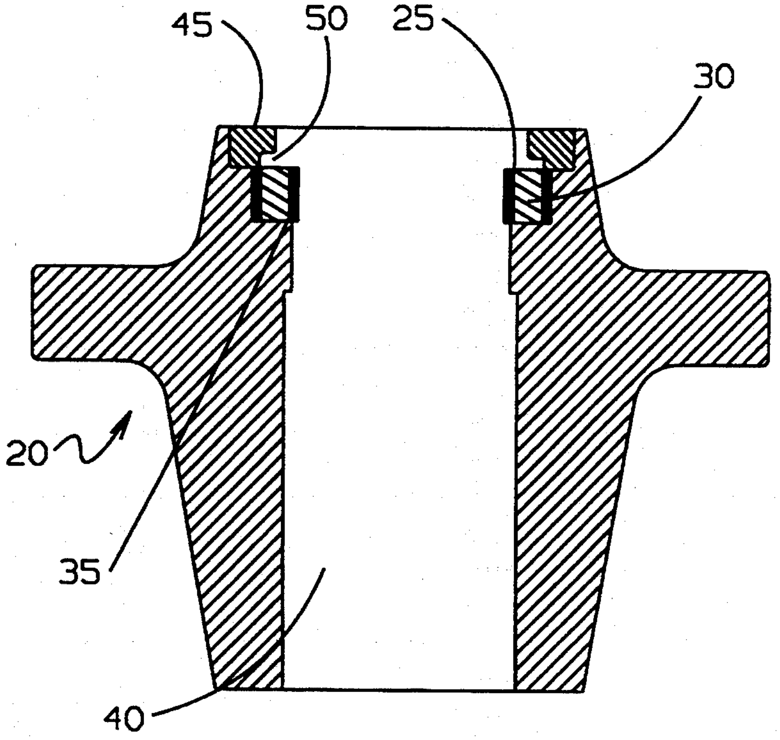
FIG. 2 shows a cross sectional view of the hub of FIG. 1.

A typical hub is shown in FIG. 1, and a cross section of the hub is shown in FIG. 2. The hub is generally referred to by numeral 20. Contained within the hub 20 is a bearing assembly 25 comprising a group of cylindrical bearings 30 positioned in a circle. The bearing assembly 25 fits over the axle so as to provide a rotatable connection with the axle. Also within the hub 20 is a cup 35 and oil reservoir 40 containing oil to lubricate the bearing assembly 25. A hub seal 45 is attached to the hub 20 so as to confine the oil and bearing assembly 25 within the hub 20.

Also, between the hub seal 45 and the bearing assembly 25 is typically an annular space 50. Depending on the hub seal and the hub, the height of this annular space 50 varies. For example, of the three most common seal types, Chicago Rawhide, Stemco, and National, the Chicago Rawhide seal provides the most annular space and the National seal provides the least annular space. Such seals are used on most common truck hubs, which are designed to be used on axles that support 34,000 to 40,000 pound loads.

Figure 3A:
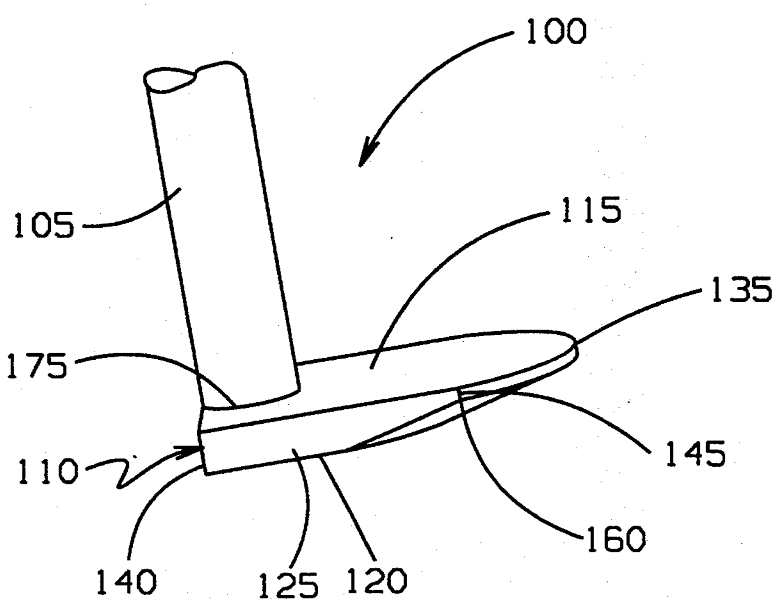
FIG. 3A shows a perspective view of a tool embodying features of the present invention for pulling a hub seal from a hub.
Figure 3B:
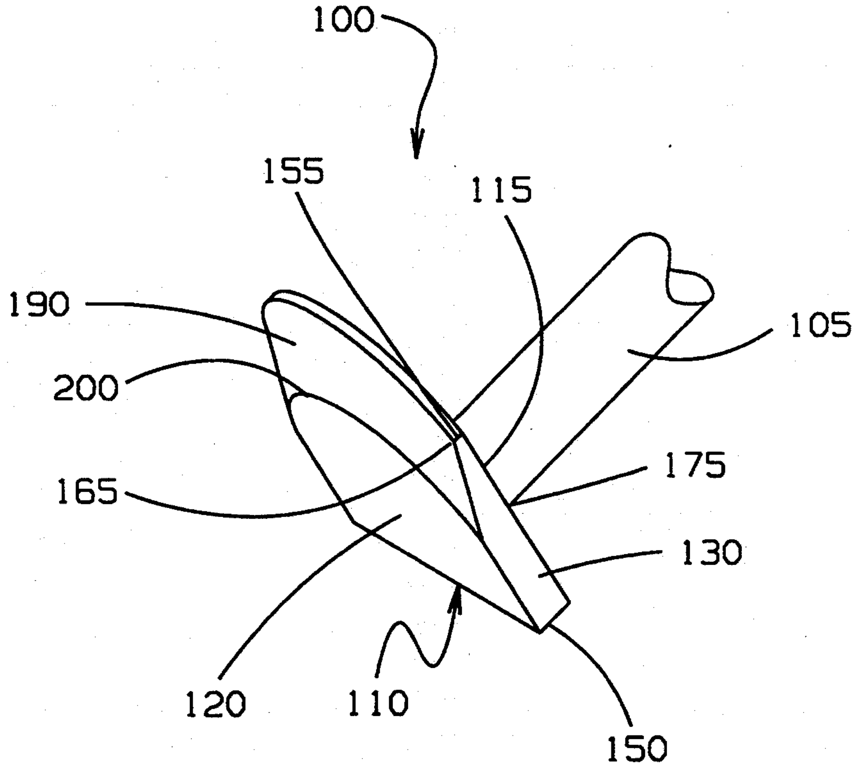
FIG. 3B shows another perspective view of the tool of FIG. 3A.

FIGS. 3A and 3B show a hub seal puller constructed in accordance with the present invention, generally referred to by numeral 100. The hub seal puller 100 comprises a handle 105 attached to and generally upstanding on a blade 110. The blade comprises a first side 115, which is generally planar, a second side 120, which is generally tapered, a third flat side 125, a fourth flat side 130, and a tip edge 135. The third flat side 125 has a first long end 140 and a first short end 145. The fourth flat side 130 has a second long end 150 and a second short end 155. The tip edge 135 is generally curved. The tip edge 135 is joined to the third flat side 125 at a first tip corner 160. The tip edge 135 is also joined to the fourth flat side 130 at a second tip corner 165. In use, the hub seal puller 100 is inserted into the annular space 50, as shown in FIG. 2, leverage is applied to the handle 105 using the bearing assembly 25 as a fulcrum, and the resulting force on the hub seal 45 lifts the hub seal 45 from the hub 20.

Figure 4:
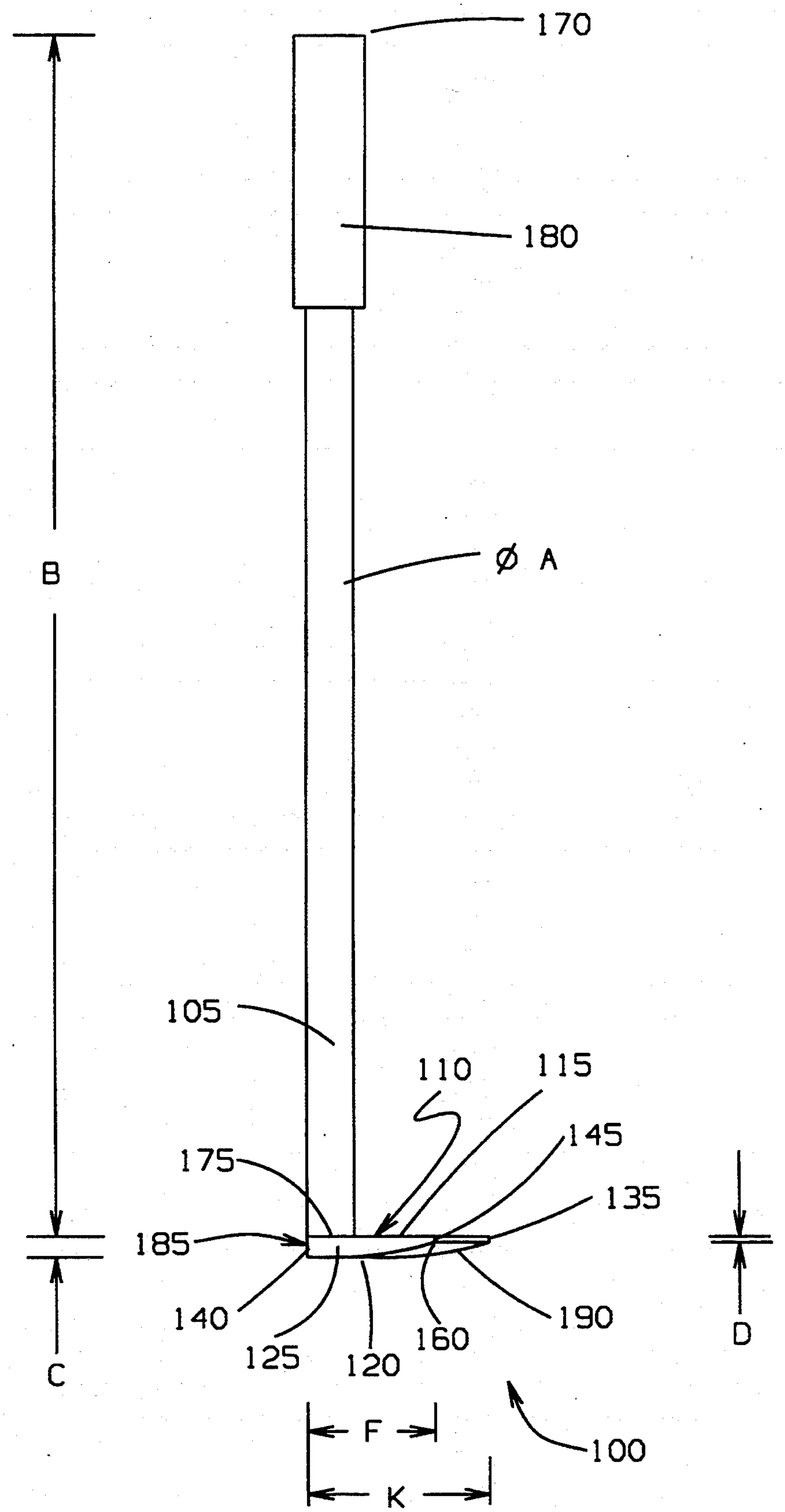
FIG. 4 is a side view of the tool of FIG. 3A.

As shown in FIG. 4, the handle 105 comprises a grip end 170 and a blade end 175. The handle 105 is preferably attached to the blade 110 at the blade end 175 by either a weld or by forging the hub seal puller 100. In one preferred embodiment, the grip end 170 has a grip 180 attached so the mechanic may better grasp the hub seal puller 100. The grip 180 is preferably made from rubber or plastic. Alternatively, the grip end 170 may be knurled. The handle 105 is preferably cylindrical, with a diameter A of approximately 19 millimeters and a length B of approximately 457 millimeters, with or without the grip 180.

The blade 110 further comprises a back side 185 and a tapered region 190. Preferably, the back side 185 is flush with the handle 105. The planar first side 115 is approximately 43 millimeters from the back side 185 to the longest point on the tip side 135, as shown by K. The second side 120 is generally flat in the region beneath the handle 105, but then begins to taper up toward the first side 115 at a tapered region 190. As shown, the first side 115 generally opposes the second side 120.

The third and fourth flat sides 125,130 trace the taper of the second side 120. The third flat side 125 is shown in FIG. 4. The hub seal puller 100 is preferably symmetrical from the side view (FIG. 4), and the fourth flat side 130 (not shown in FIG. 4) is opposite the hub seal puller 100 from the third flat side 125. The long end 140 has a length C that is preferably 4 millimeters long. The third flat side 125 tapers up to the first short end 145. The first short end 145 has a length D that is preferably 1 millimeter long. Also, the tip edge 135 and the tip corners 160, 165 have a length D and are also preferably 1 millimeter long. The preferred distance between the first long end 140 and the first short end 145 (F) is approximately 25 millimeters.

Figure 5:
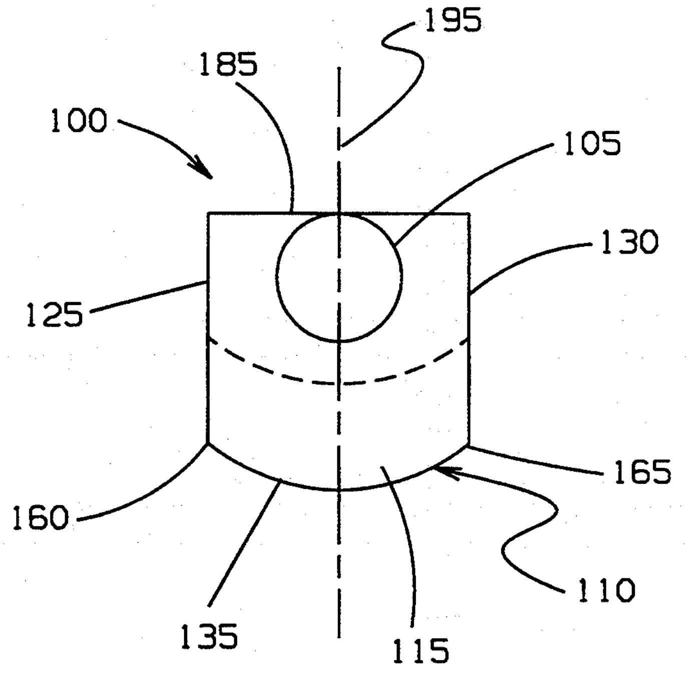
FIG. 5 is a top view of the tool of FIG. 3A.
Figure 6:
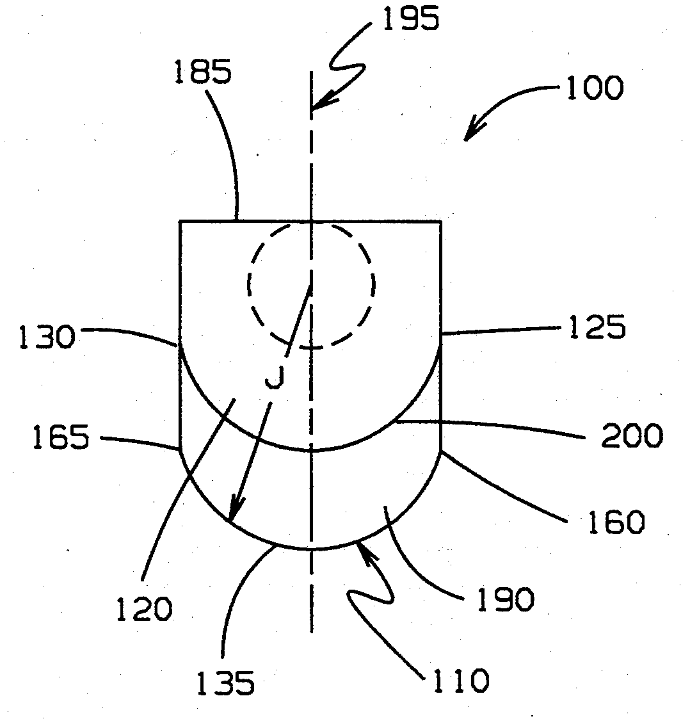
FIG. 6 is a bottom view of the tool of FIG. 3A.

As shown in FIGS. 5 and 6, the blade 110 is symmetrical about an axis of symmetry 195. Because of this symmetry, the second long end 150 is preferably 4 millimeters long as also shown by C. The second short end 155 is preferably 1 millimeter long as also shown by D. Also, the preferred distance between the second long end 150 and the second short end 155 (also shown by F) is approximately 25 millimeters.

The third flat side 125 and fourth flat side 130 are attached to the back side 185 at the first long end 140 and the second long end 150 to form preferably square corners. The first side 115 and second side 120 are curved in the area of the tip edge 135. Preferably, this curvature is an arc of a circle having a radius of 31 millimeters as shown by J. Also, as mentioned, the second side 120 is flat in the region beneath the handle 105, and has a taper boundary 200 which traces a curve on the second side 120.

The blade is preferably constructed from 1018, 1045, or 1099 steel that is heat treated to approximately 49 to 50 Rockwell C. Typically, the blade 110 is case hardened to approximately 0.5 to 0.8 millimeters deep such that the tip edge 135 is durable because it is nearly completely hardened, but the rest of the blade 110 remains relatively flexible such that it will not break in use.

Figure 7:
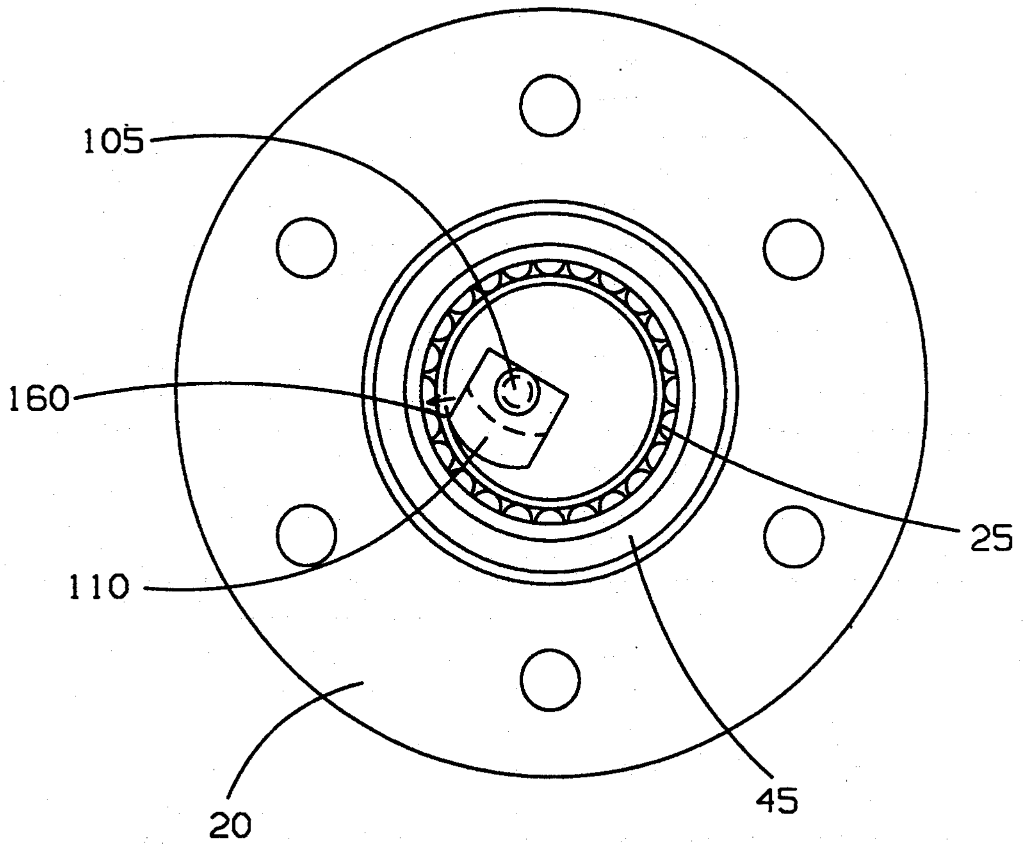
FIG. 7 is a top view of the tool of FIG. 2 as used on the hub of FIG. 1.
Figure 8A:
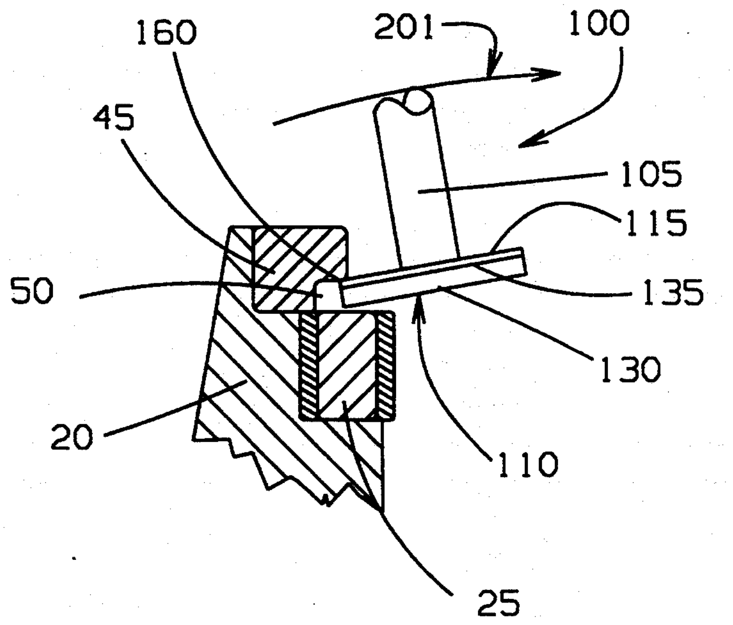
FIG. 8A is a partial sectional view of the hub of FIG. 1 demonstrating use of the tool of FIG. 3A.
Figure 8B:
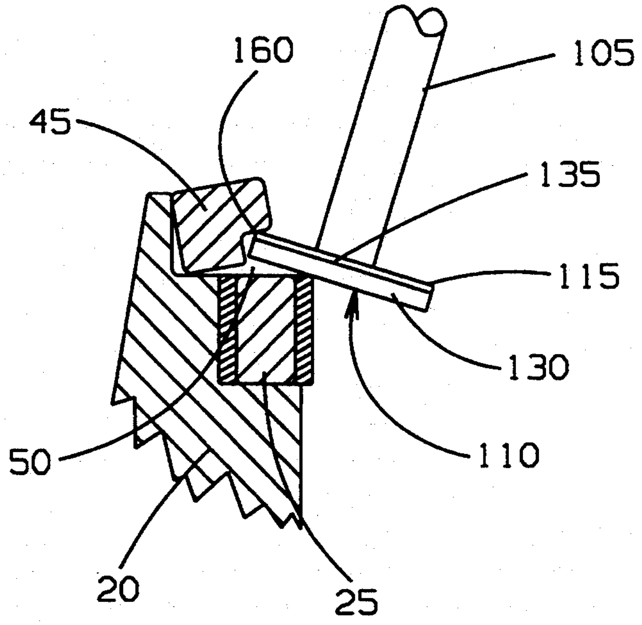
FIG. 8B is another partial sectional view of the hub of FIG. 1 demonstrating use of the tool of FIG. 3A.
Figure 9A:
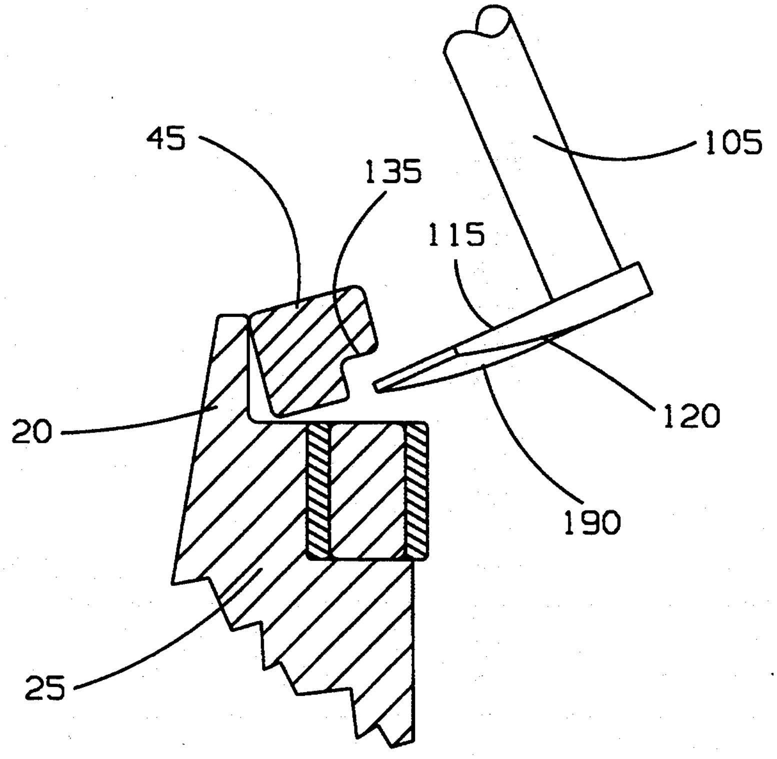
FIG. 9A is another partial sectional view of the hub of FIG. 1 demonstrating use of the tool of FIG. 3A.
Figure 9B:
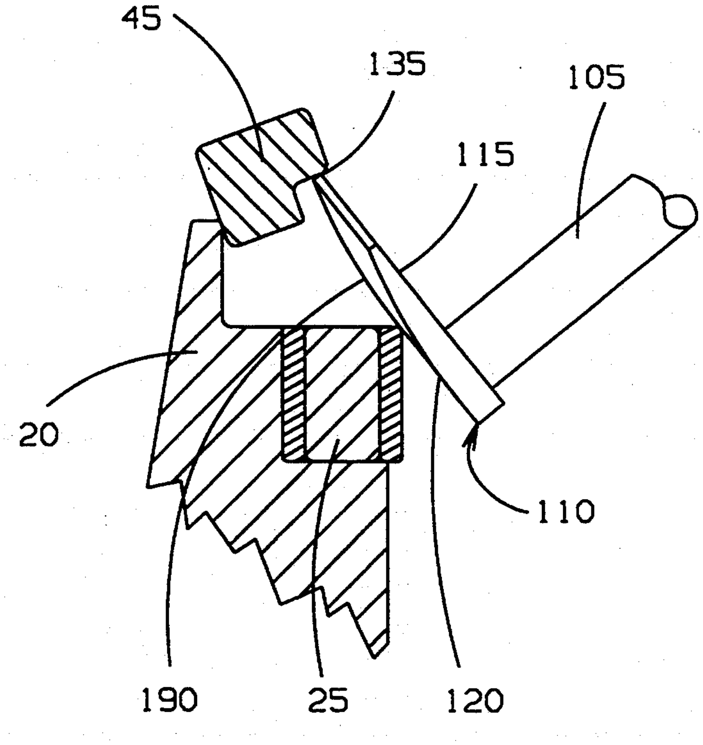
FIG. 9B is another partial sectional view of the hub of FIG. 1 demonstrating use of the tool of FIG. 3A.

FIG. 7 shows a top view of the hub 20 and demonstrates a preferred use of the hub seal puller 100 as it is inserted into the annular space 50 between the bearing assembly 25 and the hub seal 45. A tip corner, for example the first tip corner 160 as shown in FIG. 7, is first inserted into the annular space 50. As shown in FIG. 8A, the mechanic preferably works the first tip corner 160 into the annular space 50 until the blade 110 is wedged between the hub seal 45 and the bearing assembly 25. Then, using the bearing assembly 25 as a fulcrum, the mechanic applies a leverage force on the handle 105 in the direction indicated by arrow 201 so as to create a larger clearance between the hub seal 45 and the bearing assembly 25. This is shown in FIG. 8B. The mechanic removes the hub seal puller 100 and then, as shown in FIG. 9A, inserts the tip edge 135 between the hub seal 45 and the bearing assembly 25. The blade 110 preferably rests on the bearing assembly 25. Using the bearing assembly as a fulcrum against the tapered region 190, the mechanic again applies a leverage force on the handle 105 to remove the hub seal 45 from the hub 20. Removal of hub 20 is shown in FIG. 9B.

The previously described versions of the present invention have many advantages, including the advantages as mentioned below. Using the hub seal puller as described, the mechanic can remove, without fear of injury to himself, a typical hub seal from the hub within several seconds, as contrasted with the danger and a removal time of fifteen minutes when using the hammer and drift method as outlined above. Also, the method as described using the present invention does not damage the bearing assembly while it is being used as a fulcrum. Bearing assemblies are typically constructed to withstand significant abuse. As outlined, the mechanic must repeatedly strike the bearing assembly with a drift to remove the hub seal using the hammer and drift method. Furthermore, unlike other seal pullers, the blade is constructed in a manner so it will not roll or break under the force necessary to remove hub seals from hubs used on larger trucks present in either the tractor or the trailer. With the present invention, the mechanic need not possess great strength or strike the handle with a hammer to remove the hub seal. Finally, the mechanic need not work through the oil reservoir so his or her hands and the hub seal puller remain clean. The tip edge and tip corners are designed to work on nearly every hub seal. The hub seal puller works on the three most common hub seal types: the National, Chicago Rawhide, and Stemco seals.

To summarize, the present invention provides a tool that may be used to quickly, cleanly, easily, and safely remove hub seals from hubs of various sizes, but particularly the hubs of larger trucks. To add to the appearance of this tool, the hub seal puller preferably is plated with yellow zinc such that it has a gold finish.

Although the present invention has been described with reference to preferred embodiments, workers skilled in the art will recognize that changes may be made in form and detail without departing from the spirit and scope of the invention.

What is claimed is:

1. A hub seal puller suitable for pulling a hub seal from a wheel hub, the wheel hub including a bearing assembly separated from the hub seal by an annular space, the hub seal puller comprising:
  a single blade, including:
    a first side comprising a generally planar surface;
    a second side comprising a generally tapered surface wherein the second side generally opposes the first side;
    a third flat side joining a first portion of the first and second sides wherein the third flat side is generally planar and generally perpendicular to the first side;
    a fourth flat side joining a second portion of the first and second sides;
    a single arcuate tip edge connecting the first side, second side, third flat side, and fourth flat side wherein the tip edge is generally perpendicular to the first side; and
    wherein the first side, second side, third flat side and the edge intersect to form a first tip corner; and
    a handle having a blade end and a grip end wherein the handle is affixed to the first side at the blade end and positioned so as to be generally upstanding on the blade and generally opposite the second side such that the hub seal puller is suitable for pulling a hub seal from a wheel hub.

2. The hub seal puller of claim 1 wherein the handle comprises a cylinder having a length and a diameter.

3. The hub seal puller of claim 2 wherein the handle further comprises a grip affixed to the grip end.

4. The hub seal puller of claim 1 wherein the third and fourth flat sides are generally planar and generally perpendicular to the first side; and
  wherein the tip edge has a tip edge height, generally normal to the first side.

5. The hub seal puller of claim 4 wherein the third and fourth flat sides comprise:
  a first long end on the third flat side;
  a first short end on the third flat side, opposite the first long end;
  a second long end on the fourth flat side wherein the second long end is on an opposite side of the blade from the first long end; and
  a second short end on the fourth flat side, opposite the second long end wherein the second short end is on an opposite side of the blade from the first short end.

6. The hub seal puller of claim 5 and further comprising:
  a second tip corner having a second tip corner height, the second tip corner formed by intersection of the arcuate tip edge, first side, second side, and second short edge.

7. The hub seal puller of claim 6 wherein the first tip corner height is suitable to place the first tip corner within the annular space between the hub seal and the bearing assembly.

8. The hub seal puller of claim 7 wherein the first tip corner height is approximately 1 millimeter.

9. The hub seal puller of claim 8 wherein the first tip corner height is generally equivalent to the second tip corner height.

10. The hub seal puller of claim 4 wherein the arcuate tip edge height is approximately 1 millimeter.

11. The hub seal puller of claim 4 wherein the arcuate tip edge includes a radius.

12. The hub seal puller of claim 11 wherein the radius is approximately 31 millimeters.

13. The hub seal puller of claim 1 wherein the blade is formed from case hardened steel.

* * * * *